United States Patent
Kaplinsky

(10) Patent No.: US 7,570,282 B1
(45) Date of Patent: Aug. 4, 2009

(54) COLOR CORRECTION OF MULTIPLE COLORS USING A CALIBRATED TECHNIQUE

(75) Inventor: Michael Kaplinsky, Monrovia, CA (US)

(73) Assignee: Aptina Imaging Corporation, Grand Cayman (KY)

(*) Notice: Subject to any disclaimer, the term of this patent is extended or adjusted under 35 U.S.C. 154(b) by 701 days.

(21) Appl. No.: 09/209,982

(22) Filed: Dec. 9, 1998

(51) Int. Cl.
*H04N 17/02* (2006.01)
*H04N 9/43* (2006.01)
*H04N 1/46* (2006.01)
*G06K 9/00* (2006.01)

(52) U.S. Cl. .............. 348/188; 348/223.1; 382/167; 358/504; 358/516

(58) Field of Classification Search ............ 348/188, 348/273, 275, 223.1, 25, 187, 225.1, 29; 356/421, 422; 382/167; 358/504, 516, 523
See application file for complete search history.

(56) References Cited

U.S. PATENT DOCUMENTS

| | | | | |
|---|---|---|---|---|
| 5,448,381 A | * | 9/1995 | Bohan et al. | 358/518 |
| 5,539,523 A | * | 7/1996 | Nakai et al. | 358/504 |
| 5,930,009 A | * | 7/1999 | Sato et al. | 358/518 |
| 6,055,074 A | * | 4/2000 | Himoto | 382/167 |
| 6,075,888 A | * | 6/2000 | Schwartz | 382/167 |
| 6,256,062 B1 | * | 7/2001 | Endo | 348/223.1 |
| 6,320,668 B1 | * | 11/2001 | Kim | 358/504 |
| 6,430,313 B1 | * | 8/2002 | Smith et al. | 382/167 |
| 6,535,301 B1 | * | 3/2003 | Kuwata et al. | 358/520 |
| 6,542,185 B1 | * | 4/2003 | Bogardus | 348/223.1 |
| 6,600,833 B1 | * | 7/2003 | Tan et al. | 382/167 |
| 6,618,079 B1 | * | 9/2003 | Higuchi | 348/223.1 |
| 6,724,423 B1 | * | 4/2004 | Sudo | 348/223.1 |
| 6,980,231 B1 | * | 12/2005 | Ohsawa | 348/188 |
| 7,053,935 B2 | * | 5/2006 | Guimaraes et al. | 348/222.1 |
| 2005/0018226 A1 | * | 1/2005 | Chiba | 382/167 |
| 2005/0046883 A1 | * | 3/2005 | Chiba | 358/518 |

FOREIGN PATENT DOCUMENTS

JP 02074367 A * 3/1990
JP 2001204041 A * 7/2001

OTHER PUBLICATIONS

Translation of Japanese Publication No. 02-074367, provided by FLS, Inc. Mar. 2003.*

* cited by examiner

*Primary Examiner*—John M Villecco
(74) *Attorney, Agent, or Firm*—Dickstein Shapiro LLP

(57) ABSTRACT

A system of correcting for color filter array by correcting for a plurality of colors in the color filter array. A color correction matrix is formed which corrects each color for a plurality of desired characteristics simultaneously. These desired characteristics can include, for example, all 24 colors in a chromaticity chart. An additional aspect includes weighting the more important colors relative to the less important colors.

19 Claims, 4 Drawing Sheets
(1 of 4 Drawing Sheet(s) Filed in Color)

COLOR CORRECTION OF MULTIPLE COLORS USING A CALIBRATED TECHNIQUE

BACKGROUND

A typical color camera separately monitors red, green, and blue components of an image. Electronic imagers rely on some means of separation of the illumination incident on the sensor into a number of spectral channels. Widely-used means of discrimination between spectral components of the imaging scene include the Color Filter Arrays (usually employed in systems based on single focal plane array) and beam-splitting prisms (primarily employed in systems based on multiple focal plane arrays). In either case, the incident illumination is separated into a small number, usually 3 or 4, discrete color (spectral) channels.

For any given scene, the exact ratio of color channel values will depend on the spectral characteristics of the entire optical stage of the imager. This is typically done using a color filter array over a photosensitive area. The color filter array is formed of a plurality of different colored elements, which respectively pass only color of a predetermined spectral parameter.

A typical color filter array is shown in FIG. 1A. Each of the boxes such as 100 represents a single pixel. Each set of four boxes outlined by the line 102 can be considered as a megapixel. The pattern in the megapixel repeats throughout the entire color filter array grid.

Spectral channels of the modern color imagers do not have the same spectral sensitivities as color-sensitive elements, the cones, of the human eye. FIGS. 1B-1D respectively illustrate the spectral sensitivity curves of the human eye ($\beta$, $\gamma$, $\rho$) and spectral transmittances of the red, green and blue color channels typical for modern RGB electronic imaging systems. As a consequence, the direct use of individual color channels values of the imager as stimuli for typical display devices, such as VGA or NTSC monitors, does not lead to correct color rendition. Hence, colors are corrected color signals detected by the electronic imaging system into color channel stimuli appropriate for the output to the image rendering device.

Each megapixel 102 has two green filters, one red filter, and one blue filter. This is because the eye is usually more sensitive to green than it is to red and blue.

The intent of the filter of FIG. 1A is to provide an image which is precisely matched to the spectral content of the eye. However, this filter, while it does the best that it can, is not precisely matched. It is often desirable to interpolate between the values.

For example, the value received at area 100 is only indicative of the green portion impinging on area 100. However, some part of that incoming light is also red. Another part of the incoming light is also blue. Hence, each of the pixels is processed according to a transformation to solve the equation:

$R = K_{11}R + K_{12}G + K_{13}B$ $G = K_{21}R + K_{22}G + K_{23}B$ $B = K_{31}R + K_{32}G + K_{33}B$

This transformation completely defines the system. This includes the so-called color transformation matrix:

$K_{11}$ $K_{12}$ $K_{13}$
$K_{21}$ $K_{22}$ $K_{23}$
$K_{31}$ $K_{32}$ $K_{33}$

SUMMARY

The inventor recognized from the above, however, that this corrects only for red, green, and blue parts of the image. The actual red, green, and blue colors look good. The other colors are not corrected quite as well.

The present system corrects the signal for all of a plurality of desired colors. This is complicated, however, by the fact that one only has control over red, green, and blue.

According to the system as disclosed herein, the operation is broken down into a number of colors, e.g., 24 colors. The camera is used to detect a color chart or a chromaticity chart which has the 24 colors of interest. Each detected color is compared with a reference color. The coefficients of the color coefficient matrix are adjusted to make each of those colors approach the reference color more exactly. Another aspect weights the colors so that the most important colors obtain more correction.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other aspects of the invention will be described in detail with respect to the accompanying drawings, wherein:

FIG. 1 shows a prior art megapixel system used in a color filter array;

DESCRIPTION OF THE PREFERRED EMBODIMENTS

Figure 1A:
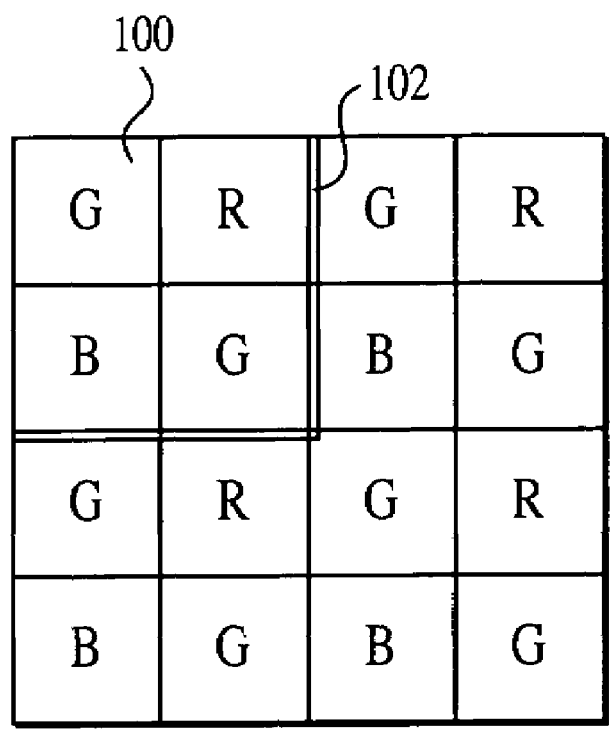
FIGS. 1A-1D illustrate the sensitivity of the eye to different colors.
Figure 1B:
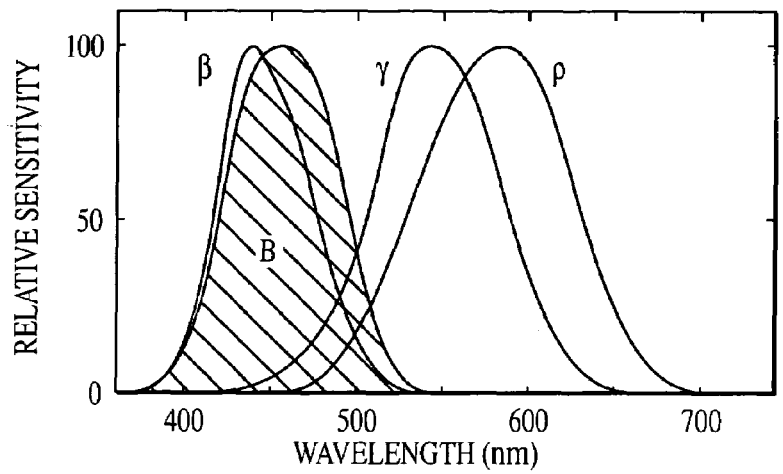
Figure 1C:
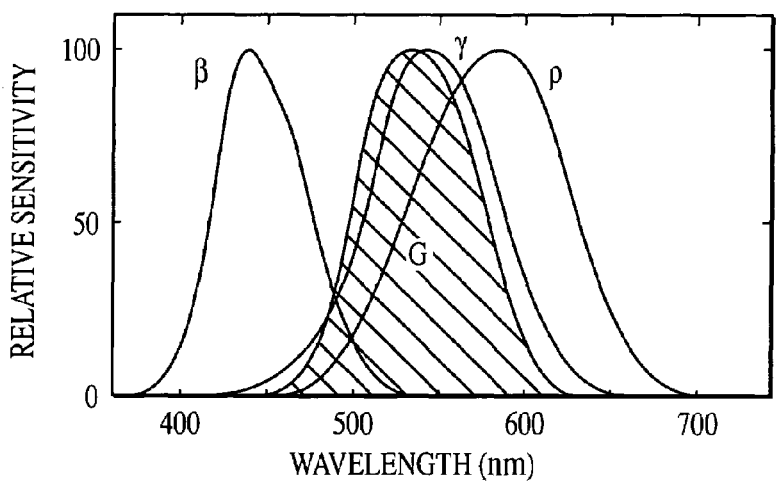
Figure 1D:
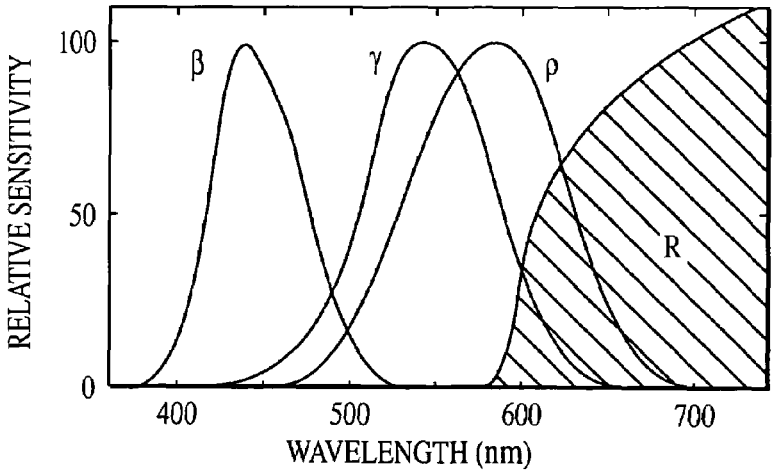

The conventional techniques to determine the coefficients Kij of the color correction matrix are based on analyzing the image of color calibration chart with N distinct color elements. In order to calculate a color correction matrix from the image of the color calibration chart, the appropriate stimuli Yi, suitable for driving a given image rendering device, must be known for each element of the chart from an independent experiment. Such color measurement techniques are, for example, specified by the Commission on Illumination (CIE). Each of N distinct elements of the calibration color chart Yi are known. Xi are determined based on imaging of the chart. The coefficients of the color correction matrix solve $N^2$ linear equations or solve N equations for each chart element.

Color correction matrix obtained by this technique provides for correction of color rendition of all N colors used in the process, provided that the colors could be physically displayed by the image rendering device and that they are within the spectral sensitivity range of the imaging system.

Even though the color correction matrix obtained by this approach provides for good rendition of the N colors used in calibration, other target colors are not rendered correctly.

In fact, in many real imaging systems once the basic colors (such as red, green and blue in RGB systems) have been calibrated, the white elements of the scene appear as pink or blue. To counteract this effect, many electronic imaging systems employ white balancing techniques subsequently to color correction. White balancing algorithms aim at achieving good rendition of white color by adjusting (dynamically or statically) the gains on individual color channels. This procedure, in effect, modifies the coefficients of the color correction matrix. However, modification of the color correction matrix inevitably leads to deterioration of the rendition quality of the basic colors used in color calibration. For example, in RGB systems, the good quality of rendition of white is achieved at the expense of somewhat arbitrary degradation of red, green and blue. In extreme cases, white balancing may lead to the situation where only white color is rendered correctly and most other colors are visibly distorted.

In general, it is difficult to achieve "perfect" color rendition across the entire visible spectrum using electronic imaging system with finite number of color channels. Since the spectral sensitivities of realistic imaging systems and the human eyes do differ at every wavelength, every color representable by the image rendering device would have to be corrected individually. For example, a VGA monitor with 24 bits per pixel (8 bits per color channel) would require color correction matrix with $2^{24}$ rows to achieve the best possible color rendition.

This system selects a number of colors including at least the primary colors (3), white, and at least 1-20 other colors, preferably at least 3 others. This generates the N×N color correction matrix for any given N-channel imaging system that would yield the best possible compromise in quality of the rendition of the large numbers of colors, as opposed to perfecting rendition of N colors at the expense of others. All of these colors must be balanced.

Figure 2:
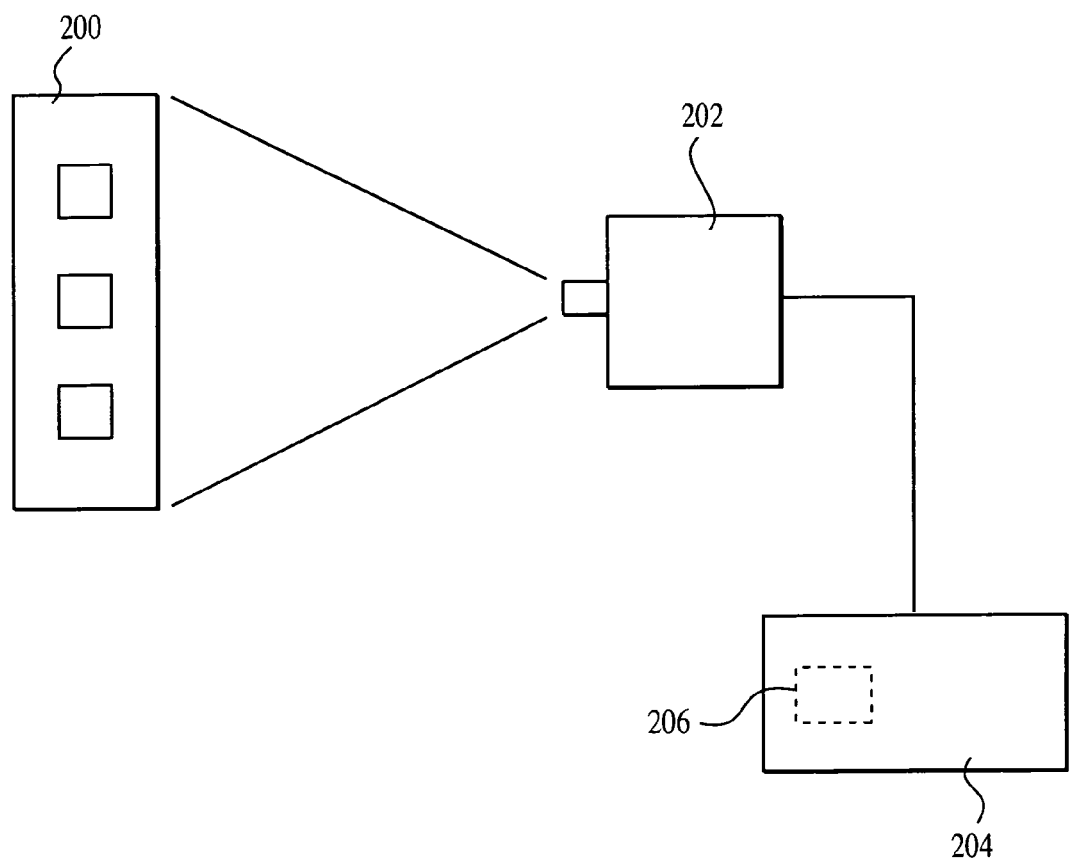
FIG. 2 shows a basic setup of the system of the present embodiment.

The preferred setup is shown in FIG. 2. A color chart 200 has thereon a plurality of desired colors. While the preferred embodiment uses 24 colors, any number could be alternately used. Any number of colors, greater than the three primary colors (red, green, and blue or cyan, magenta, yellow) could be used. A video camera 202 obtains an image of the color chart 200, which is processed in the image processor 204. Preferably those other colors include at least white, and at least three other preferred colors, but more preferably the other colors include 20 other colors total for a total of 24 colors.

Image processor 204 compares each detected color with a reference color.

The color calibration chart has a number of distinct color elements corresponding to the colors that are deemed important for overall good color rendition of the electronic imager. For an N-channel imager, the proposed technique does not impose any limitation on the number of colors to be optimized, as long as the calibration table contains at least N+1 distinct color elements. The color channel stimuli Yi appropriate for the given image rendering device (such as RGB values for VGA monitor) should also be known for each color element of the calibration chart from an independent experiment.

The techniques for characterizing the calibration chart are beyond the scope of the present disclosure. There is a number of commercially-available and well known color calibration charts characterized by their manufacturers in accordance with standard techniques set by standard-defining organizations such as Inter-Society Color Council at National Bureau of Standards (ISCC) and International Commission on Illumination (CIE).

In order to generate an optimal color correction matrix 206, the calibration chart 200 is imaged under illumination conditions similar to those that will be used during normal operation of the imager. Once the image of the chart is obtained, the detected signal values of each color channel Xi of the imager are recorded for all color elements of the calibration chart.

For each of the colors to be corrected, three least-squares fits are carried out. The least-squares fits are done for each of the primary colors; here, red, green, and blue. An error signal $G_E$ is obtained by taking the square of the difference between Gn' (what one expects to see for the green color) subtracted from the G actual (what one actually sees). Similar operations are done for red and blue.

The mathematical representation of this operation is shown in Equation 3.

$$(Gn'[\text{what expect to see}] - G_C[\text{actual}])^2 = G_E$$

$$(Rn' - R_C)^2 = R_E$$

$$(Bn' - B_C)^2 = B_E \quad (3)$$

The goal of this technique is to minimize $G_E$, $R_E$, and $B_E$ for all of the 24 colors, all for all of the desired colors for which correction is to be carried out. The coefficients in the color correction matrix of Equation 2 are adjusted in order to minimize the 24, three-item sets. This can be done by trial and error, or by solution using linear equations to dynamically change all the values until the best mix is reached. The minimization can be expressed mathematically as $$\min_{C_{k1}, C_{k2}, \ldots, C_K} \sum_{J=1}^{M} \left[ \left( \sum_{i=1}^{N} C_{ki} \cdot X_1^J \right) - Y_1^J \right]^2 \to C_{k1},$$

$$C_{k2}, \ldots, C_{kN}; k = 1, \ldots N$$

where K is the number of the color channel currently being calibrated, M is the number of color chart elements used for calibration, and N is the number of the color channels in the imaging system.

Hence, this system adjusts all the values until making the best compromise.

A second embodiment notes that color calibration based on Equation (2) results in the color correction matrix that yields comparable quality of color rendition for all colors in the calibration chart. However, the distortion of some colors impacts subjective image quality more than the distortion of other "less important" colors. For example, poor color rendition of white, gray and skin colors is more noticeable than poor rendition of blue and yellow parts of spectra.

This embodiment, therefore, modifies the color calibration process to attach more importance to some colors at the expense of the others. In the context of proposed least-squares based method, the ability to prioritize colors is achieved by using weighting coefficients multiplying individual color deviations.

Therefore, in this embodiment, the color correction matrix is evaluated based on minimization of the weighted sum of squares of differences between detected color channel values Xi and corresponding stimuli Yi across entire set of color elements of the calibration chart as follows:

$$\min_{C_{k1},C_{k2},\ldots,C_K} \sum_{J=1}^{M}\left[\left(\sum_{i=1}^{N} C_{ki} \cdot X_I^J\right) - Y_1^J\right]^2 W_j \to C_{k1},$$

$$C_{k2}, \ldots, C_{kN}; k = 1, \ldots N$$

where Wj is the weight given to the color of the j-th element of the calibration color chart.

This uses the equations shown in Equation 4.

$$(Gn'-G_c)^2 \cdot W_i = G_E$$

$$(Rn'-R_c)^2 \cdot W_i = R_E$$

$$(Bn'-B_c)^2 \cdot W_i = B_E \qquad (4)$$

Where I is between 1 and 24 and each of the I's representing a different color, this second embodiment adds a weighting factor $W_i$. Each color is weighted according to its importance in seeing an image the way the eye expects to see the image. Practically speaking, red, green, and blue are extremely important, white is important, skin color and gray scale are also important. Unimportant ones are brown and other dull colors. All of the rest are medium importance.

Since this system takes care of all colors simultaneously, one obtains the best possible trade-off between all of the different possibilities.

A preferred mode uses a 3-color RGB Bayer pattern color filter assembly. The system uses 24-color GretagMacbeth ColorChecker chart marketed by GretagMacbeth, New Windsor, N.Y. as the color calibration chart. GretagMacbeth describes their chart as "Checkerboard array of 24 scientifically prepared color squares in a wide range of colors. Many of these squares represent natural objects of special interest, such as human skin, foliage and blue sky. These squares are not only the same color as their counterparts, but also reflect light the same way in all parts of the visible spectrum. Because of this unique feature, the squares will match the colors of natural objects under any illumination and with any color reproduction process.

This preferred mode assigned higher weights to chart elements corresponding to red, green, blue and human skin elements as well as a number of greyscale elements.

Figure 3:
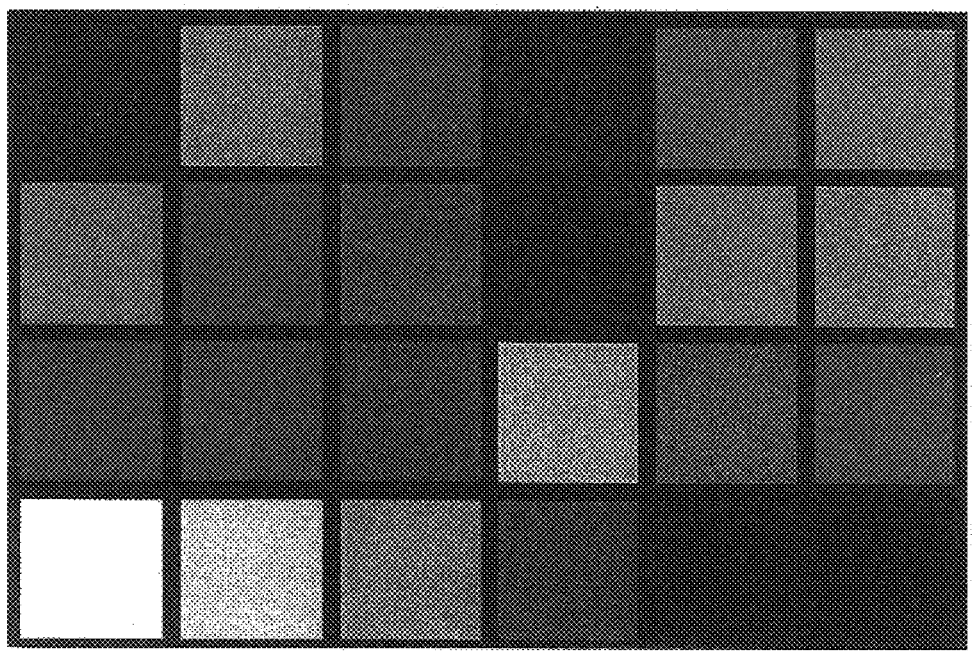
FIG. 3 illustrates a typical calibration chart.

FIG. 3 shows an exemplary ColorChecker chart.

Another aspect of the present specification is the approach to white balance procedures in conjunction with use of the color correction matrix generated by described above method. As mentioned in the Background, the conventional approach to white balancing is to adjust the pre-computed color correction matrix so that the image areas corresponding to white colors appear white. This is usually done by adjusting individual gains on the color channels of the imager to achieve equality of all color components for white areas of the image. However, the byproduct of this procedure is that the quality of the color rendition for colors used during calibration of the color correction matrix is being somewhat arbitrarily compromised. In contrast, the color correction method disclosed here results in optimal balance between quality of rendition of white as well as other important colors that were given high weights during color calibration. Thus optimal white balance is "built-in" the color correction matrix and does not require further adjustments as long as the spectra of the illumination does not change.

Another important reason for using dynamic real-time white balancing in imaging systems is to compensate for possible changes in the illumination spectra. From this point of view, dynamic white balancing will be beneficial to systems calibrated according to the present invention as well. However, since the initial color correction matrix determined from Equation (3) already provides white balance under the same illumination spectra as was used for calibration, the traditional methods of dynamic white balancing should be modified.

In systems calibrated in accordance with the present system, the aim of the dynamic white balancing is to keep ratios of the color channels of the imager at white areas of the image equal to the ratios of the same color channels measured for white image areas in the same illumination conditions as existed during calibration. This approach allows to dynamically compensate for changing illumination spectra without favoring the quality of rendition of white at the expense of other colors.

Although only a few embodiments have been described in detail above, those of ordinary skill in the art will understand that modifications are possible without departing from the teaching noted above.

What is claimed is:

1. An image correction method comprising:
    obtaining expected signals for an image-rendering device of each of a plurality of known reference colors;
    obtaining detected signals by imaging a color image array under conditions similar to those occurring during user operation of an image sensor, said detected signals being obtained for said plurality of known reference colors, said plurality of known reference colors including white, at least three primary colors, and at least two other non-primary colors;
    determining an error measure, $G_E$, $R_E$, $B_E$, for each of said plurality of known reference colors, said error measure being calculated by $$(Gn'-G_c)^2 = G_E$$

$$(Rn'-R_c)^2 = R_E$$

$$(Bn'-B_c)^2 = B_E$$

where Gn', Rn' and Bn' are expected color values, $G_c$, $R_c$ and $B_c$ are actual detected color values;
    applying a weight factor to said error measure for each of said plurality of known reference colors to obtain a respective weighted error measure for each of said plurality of known reference colors; and
    obtaining a color correction matrix by simultaneously reducing the weighted error measure for each of said plurality of known reference colors to obtain color correction for said plurality of known reference colors.

2. A method as in claim 1 wherein the weight factor is multiplied by said error measure for each of the plurality of known reference colors to obtain the weighted error measure, and wherein the weight factor may have a different value for each of the plurality of known reference colors.

3. A method as in claim 1 wherein there are at least seven reference colors.

4. A method as in claim 1 wherein there are twenty-four reference colors.

5. A method as in claim 1, wherein higher weight factors are applied to colors including at least one of red, green, blue, human skin elements, and gray scale elements than are applied to other colors.

6. A method as in claim 1, wherein said weight factor is assigned to a respective color based on an impact on subjective image quality.

7. A method as in claim 1 wherein the detected signals are obtained for each of a plurality of color channels of said image sensor.

8. The image correction method as in claim 1, further comprising applying said color correction matrix to an input image obtained using said image sensor with said color image array to provide color correction for each of said plurality of known reference colors to obtain a color-corrected image from said input image.

9. An image sensor apparatus, comprising:
an image sensor device, operating using a color filter array which provides color filtering such that colors transmitted to each pixel of a color image array of said image sensor device are converted to signals for all color components provided by said color filtering; and
an image processor arranged and configured to color-correct images obtained by said image sensor device according to a color correction matrix obtained by simultaneously reducing respective weighted error measures, each of said weighted error measures being calculated by applying a weight factor to a squared difference between signals seen for a known reference color from said color image array of said image sensor device and signals expected to be seen for said reference color, said color correction matrix being obtained according to at least the color white, three primary colors, and at least two additional non-primary colors.

10. An apparatus as in claim 9 wherein said image processor is configured and arranged to obtain said color correction matrix according to at least three primary colors, the color white, and at least three colors other than said three primary colors and white.

11. An apparatus as in claim 9 wherein said color correction matrix is obtained according to twenty-four colors.

12. An apparatus as in claim 9 wherein said weighted error measures are calculated according to $(Gn'-G_c)^2 \cdot W_i = G_E$ $(Rn'-R_c)^2 \cdot W_i = R_E$ $(Bn'-B_c)^2 \cdot W_i = B_E$ where Gn', Rn' and Bn' are expected color values, $G_c$, $R_c$ and $B_c$ are actual color values, and $W_i$ is the weight factor for each of colors i, i varying from 1-j colors, and $G_E$, $R_E$, and $B_E$ are reduced for each of the plurality of colors.

13. An apparatus as in claim 12 wherein the weight factors for red, green, and blue are higher than those of other colors.

14. An apparatus as in claim 12, wherein simultaneous equations are used to reduce $G_E$, $R_E$, and $B_E$ for each of the plurality of colors.

15. An apparatus as in claim 12, wherein said weight factors $W_i$ are assigned to a respective color based on an impact on subjective image quality.

16. An apparatus as in claim 9 wherein said color correction matrix is obtained according to all colors of a chromaticity chart.

17. A method of correcting an image from an image sensor including a color image array having a plurality of pixels, comprising:
obtaining signals expected to be seen for each of a plurality of known reference colors; and
obtaining a color correction matrix for said pixels, said color correction matrix being one which takes into account correction for at least the color white, three primary colors, and two other non-primary colors by simultaneously reducing error measures relative to each color, wherein respective error measures for said non-primary colors are weighted such that said color correction matrix corrects for some of said non-primary colors more than said primary colors, each error measure representing a squared difference between signals actually seen for a known reference color from said color image array and said signals expected to be seen for each of said reference outputs.

18. A method as in claim 17 wherein the detected signals are obtained for each of a plurality of color channels of said color image array.

19. The method as in claim 17, further comprising applying said color correction matrix to obtain a subjectively color-corrected and white-balanced image directly from an input image obtained using said color image array.

* * * * *